(12) United States Patent
Duan

(10) Patent No.: US 11,750,101 B2
(45) Date of Patent: Sep. 5, 2023

(54) RESONANT CONVERTER

(71) Applicant: SHENZHEN HUNTKEY ELECTRIC CO., LTD., Guangdong (CN)

(72) Inventor: Weiyin Duan, Guangdong (CN)

(73) Assignee: SHENZHEN HUNTKEY ELECTRIC CO., LTD., Shenzhen (CN)

( * ) Notice: Subject to any disclaimer, the term of this patent is extended or adjusted under 35 U.S.C. 154(b) by 265 days.

(21) Appl. No.: 17/298,535

(22) PCT Filed: Apr. 3, 2020

(86) PCT No.: PCT/CN2020/083338
§ 371 (c)(1),
(2) Date: May 28, 2021

(87) PCT Pub. No.: WO2020/207358
PCT Pub. Date: Oct. 15, 2020

(65) Prior Publication Data
US 2022/0029542 A1    Jan. 27, 2022

(30) Foreign Application Priority Data

Apr. 8, 2019    (CN) .......................... 201910276351.8

(51) Int. Cl.
*H02M 3/335* (2006.01)
*H02M 1/00* (2006.01)

(52) U.S. Cl.
CPC ..... *H02M 3/33507* (2013.01); *H02M 1/0006* (2021.05); *H02M 1/0054* (2021.05); *H02M 3/33571* (2021.05); *H02M 3/33576* (2013.01); *H02M 3/33592* (2013.01)

(58) Field of Classification Search
None
See application file for complete search history.

(56) References Cited

U.S. PATENT DOCUMENTS

| 6,545,883 B2 * | 4/2003 | Xing ................. H02M 3/33592 |
| | | 363/21.11 |
| 9,787,200 B2 * | 10/2017 | Fu ..................... H02M 3/33546 |
| 10,686,387 B2 * | 6/2020 | Kakalashvili ........... H02M 1/14 |

FOREIGN PATENT DOCUMENTS

| CN | 205544948 U | 8/2016 |
| CN | 106602880 A | 4/2017 |
| CN | 208015594 U | 10/2018 |

OTHER PUBLICATIONS

International Search Report of PCT Patent Application No. PCT/CN2020/083338 dated Jul. 2, 2020.

* cited by examiner

*Primary Examiner* — Jeffrey A Gblende

(57) ABSTRACT

A resonant converter includes an input terminal, an output terminal, a first switch, a second switch, a third switch, a fourth switch, a frequency controller, a resonant capacitor, a first transformer, a second transformer, a feedback circuit and a synchronous rectification controller. The input terminal is connected to an external power supply and the output terminal is connected to an external load. The synchronous rectifier controller is used to output a fourth control signal for controlling the fourth switch based on a voltage at the first terminal of the secondary side of the first transformer, and output a third control signal for controlling the third switch based on a voltage at the second terminal of the secondary side of said second transformer. The present application can effectively reduce the switching losses of the primary side, allowing the resonant converter to operate at a variable high frequency.

20 Claims, 7 Drawing Sheets

RESONANT CONVERTER

FIELD OF THE INVENTION

The present invention relates to the field of electronic circuits, and more particularly, to resonant converters.

BACKGROUND OF THE INVENTION

Resonant converters usually take an unstable DC current as an input and convert it to a stable DC voltage. The voltage level and current level vary depending on the application requirements. Resonant converters are usually used as a constant voltage source for power integrated circuits. In the past decades, many circuit topologies have been applied to various converters. The main types can be classified as fixed frequency pulse width modulation converters and variable frequency resonant converters.

LLC half-bridge resonant converter has higher efficiency, narrower operating voltage range and slower dynamic response. The forward/flyback converter controlled by fixed frequency pulse width modulation has lower efficiency, wider operating voltage range and faster dynamic response, and is widely used in industry. The forward/flyback converter controlled by fixed frequency pulse width modulation is also used in DC/DC power modules. The resonant converter has higher efficiency, very small resonant capacitor volume, narrow operating voltage range and slower dynamic response. The traditional converter is controlled by fixed frequency pulse width modulation. The control frequency of the primary side frequency controller of remains unchanged, and when the LLC half-bridge resonant converter is in the dead time of the upper and lower switches, the energy of the resonant inductor can only be stored in the primary side. This leads to large switching losses on the primary side, and the control frequency of the switch cannot be increased, and the higher the control frequency of the switch, the larger the power loss, resulting in the power density of the resonant converter also cannot be increased.

SUMMARY OF THE INVENTION

Based on the above situation, the purpose of the present invention is to provide a resonant converter, aiming to solve the problem in the conventional technical solution that the switching loss on the primary side is large and the control frequency of the switch cannot be increased, which leads to the power density of the resonant converter also cannot be increased.

To achieve the above purpose, the present invention provides a resonant converter including an input terminal, an output terminal, a first switch, a second switch, a third switch, a fourth switch, a frequency controller, a resonant capacitor, a first transformer, a second transformer a feedback circuit and a synchronous rectification controller. The input terminal is connected to an external power supply and the output terminal is connected to an external load. The first switch and the second switch are connected in series between the input terminal and ground. A control terminal of the first switch and a control terminal of the second switch are both connected to the frequency controller; and a common terminal connected to the first switch and the second switch is connected to one terminal of resonant capacitor. A second terminal of the primary side of the first transformer is connected to a first terminal of the primary side of the second transformer, and a first terminal of the primary side of the first transformer is connected to the other terminal of the resonant capacitor. A second terminal of the primary side of the second transformer is connected to the ground. A second terminal of the secondary side of the first transformer is connected in series with the secondary side of the second transformer, and a first terminal of the secondary side of the first transformer is connected to the ground through the third switch. A second terminal of the secondary side of the second transformer is connected to the ground through the fourth switch. A common terminal connected to the secondary side of the first transformer and the secondary side of the second transformer is connected to the output terminal. The feedback circuit is connected between the output terminal and the frequency controller. The frequency controller is configured to output a first control signal to control the first switch and a second control signal to control the second switch based on a signal output from the feedback circuit, so that the first transformer and the second transformer alternately output currents to the secondary side. A first input terminal of the synchronous rectification controller is connected to the first terminal of the secondary side of the first transformer, and a second input terminal of the synchronous rectification controller is connected to the second terminal of the secondary side of the second transformer. The synchronous rectification controller is configured to output a fourth control signal to control the fourth switch based on the voltage of the first terminal of the secondary side of the first transformer, and output a third control signal to control the third switch based on the voltage of the second terminal of the secondary side of the second transformer.

Optionally, the first transformer and the second transformer are identical transformers.

Optionally, the feedback circuit further comprises a sampling module, a comparison amplifier module, and an optocoupler. The sampling module is configured to obtain the voltage value of the output terminal. The comparison amplifier module is connected to the sampling module for comparing and amplifying an obtained voltage value of the output terminal to obtain the feedback signal of the frequency controller. The transmitting terminal of the optocoupler is connected to the comparison amplifier module, and the receiving terminal of the optocoupler is connected to the frequency controller, for isolating and feeding back the feedback signal of the frequency controller to the frequency controller.

Optionally, when the first control signal controls the first switch to disconnect and the second control signal controls the second switch to disconnect, the third control signal controls the third switch to conduct or the fourth control signal controls the fourth switch to conduct.

Optionally, when the first control signal controls the first switch to conduct, the third control signal controls the third switch to disconnect; when the second control signal controls the second switch to conduct, the fourth control signal controls the fourth switch to disconnect.

Optionally, the third control signal and the first control signal are signals with the same frequency and opposite phase, and the fourth control signal and the second control signal are signals with the same frequency and opposite phase.

Optionally, the third switch and the fourth switch are MOS transistor or wide bandgap semiconductor power field-effect transistor.

Optionally, the first switch, the second switch, the third switch and the fourth switch are MOS transistor.

Optionally, the resonant converter further includes a fifth switch and a sixth switch. The fifth switch and the sixth switch are connected in series between the input terminal and the ground. The second terminal of the primary side of the second transformer is connected to the ground through the fifth switch.

Optionally, the first switch and the fifth switch are simultaneously on or simultaneously off, and the second switch and the sixth switch are simultaneously on or simultaneously off.

Optionally, the resonant converter further includes a third transformer, a fourth transformer, a seventh switch, and an eighth switch. A second terminal of the primary side of the third transformer is connected to a first terminal of the primary side of the fourth transformer. A first terminal of the primary side of the third transformer is connected to the other terminal of the resonant capacitor. A second terminal of the primary side of the fourth transformer is connected to the ground. The secondary side of the third transformer and secondary side of the fourth transformer are connected in series. A first terminal of the secondary side of the third transformer is connected to the ground through the seventh switch; and a second terminal of the secondary side of the fourth transformer is connected to the ground through the eighth switch. A common terminal connected to the secondary side of the third transformer and the secondary side of the fourth transformer is connected the output terminal.

Optionally, the first transformer, the second transformer, the third transformer and the fourth transformer are identical transformers.

Optionally, the third switch and the seventh switch are simultaneously on or simultaneously off, and the fourth switch and the eighth switch are simultaneously on or simultaneously off.

In the above resonant converter, the primary side of one transformer is equivalent to a resonant inductor in a conventional circuit. At the same time, a synchronous rectification controller is used to control the third switch and the fourth switch on the secondary side. During the dead time of the first switch and the second switch, the synchronous rectification controller outputs a fourth control signal to control the fourth switch based on the voltage of the first terminal of the secondary side of the first transformer, and outputs a third control signal to control the third switch based on the voltage of the second terminal of the secondary side of the second transformer, so that the energy in the resonant tank can be output to the secondary side to form a continuous output current. Whether in the first half cycle or the second half cycle, the first transformer or the second transformer alternately outputs current to the secondary side, expanding the input voltage range and improving the dynamic response and power density of the resonant converter, effectively reducing the switching loss of the primary side and allowing the resonant converter to work at a variable high frequency.

BRIEF DESCRIPTION OF THE DRAWINGS

The following further describes the present invention with reference to the accompanying drawings and embodiments. In the accompanying drawings.

DETAILED DESCRIPTION

With reference to accompanying drawing, exemplary embodiments of the present invention are described in detail. It should be understood that the specific embodiments described here are only used to explain the present invention but not used to limit the present invention.

The First Embodiment

Figure 1:
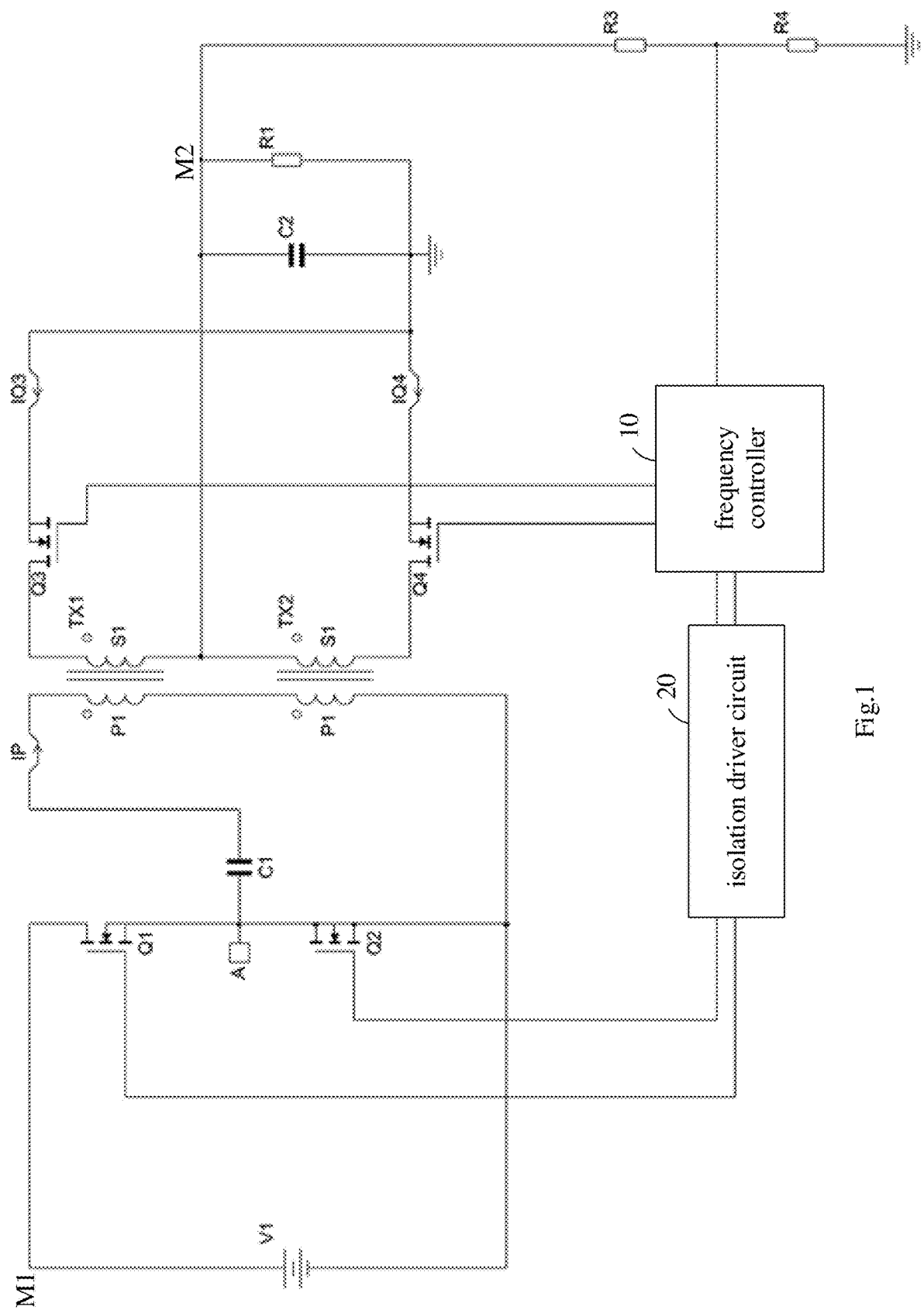
FIG. 1 is a schematic diagram of the circuit structure of the resonant converter according to the first embodiment of the present invention.

As shown in FIG. 1, this embodiment provides a resonant converter. including an input terminal M1, an output terminal M2, a first switch Q1, a second switch Q2, a frequency controller 10, a resonant capacitor C1, a first transformer TX1, a second transformer TX2, a feedback circuit, a third switch Q3, and a fourth switch Q4. The input terminal M1 is connected to an external power supply V1 and the output terminal M2 is connected to an external load R1. The first switch Q1 and the second switch Q2 are connected in series between the input terminal M1 and ground. The control terminal of the first switch Q1 and the control terminal of the second switch Q2 are both connected to the frequency controller 10. The common terminal connected to the first switch Q1 and the second switch Q2 is connected to one terminal of resonant capacitor C1. The primary side of the first transformer TX1 is connected in series with the primary side of the second transformer TX2. The first terminal of the primary side of the first transformer TX1 is connected to the other terminal of the resonant capacitor C1. The second terminal of the primary side of the second transformer TX2 is connected to the ground. The secondary side of the first transformer TX1 is connected in series with the secondary side of the second transformer TX2, and the first terminal of the secondary side of the first transformer TX1 is connected to the ground through the third switch Q3. The second terminal of the secondary side of the second transformer TX2 is connected to the ground through the fourth switch Q4. The common terminal connected to the secondary side of the first transformer TX1 and the secondary side of the second transformer TX2 is connected to the output terminal M2. The feedback circuit is connected between the output terminal M2 and the frequency controller 10. The frequency controller 10 is configured to output a first control signal to control the operation of the first switch Q1 and a second control signal to control the operation of the second switch Q2 based on the signal output from the feedback circuit.

In particular, the first transformer TX1 and the second transformer TX2 are identical transformers. The first transformer TX1 and the second transformer TX2 have the same excitation inductance and the same turn ratio of the coils on the primary and secondary sides, forming a symmetrical double-transformer structure. The resonant capacitor C1 can form an LLC resonant circuit with the primary side of the first transformer TX1 and the primary side of the second transformer TX2, respectively, during the operation cycle of the resonant converter. In this embodiment, the first switch Q1, the second switch Q2, the third switch Q3 and the fourth switch Q4 are MOS transistors. In other embodiments, they can also be electronic switching devices. The frequency controller 10 outputs the first control signal and the second control signal with variable frequency, and the first control signal and the second control signal are used to control the conduction and disconnection of the first switch Q1 and the second switch Q2, respectively.

In this embodiment, the frequency controller 10 is located on the same side as the secondary side of the first transformer TX1 and the second transformer TX2, and is also configured to output a third control signal to control the operation of the third switch Q3 and a fourth control signal to control the operation of the fourth switch Q4, based on a signal output from the feedback circuit. The frequency controller 10 is directly connected to the control terminal of the third switch Q3 and the control terminal of the fourth switch Q4.

Further, the resonant converter includes an isolation driver circuit 20. The output of the frequency controller 10 is connected to the isolation driver circuit 20. The frequency controller 10 outputs the first control signal and the second control signal. The isolation driver circuit 20 is used to isolate the first control signal and the second control signal.

The feedback circuit includes a first voltage divider resistor R3 and a second voltage divider resistor R4. The first voltage divider resistor R3 and the second voltage divider resistor R4 are connected in series between the output terminal M2 of the resonant converter and the ground. The common connection terminal of the first voltage divider resistor R3 and the second voltage divider resistor R4 is connected to the frequency controller 10, directly feedback the collected voltage signal to the frequency controller 10.

Moreover, when the frequency controller 10 is located on the same side as the secondary side of the transformer, the feedback circuit is simplified, and the synchronous rectification control circuit is not needed, which provides good dynamic response, and facilitates the connection with digital interface circuit, such as USB-PD, PMBUS.

The Second Embodiment

Figure 2:
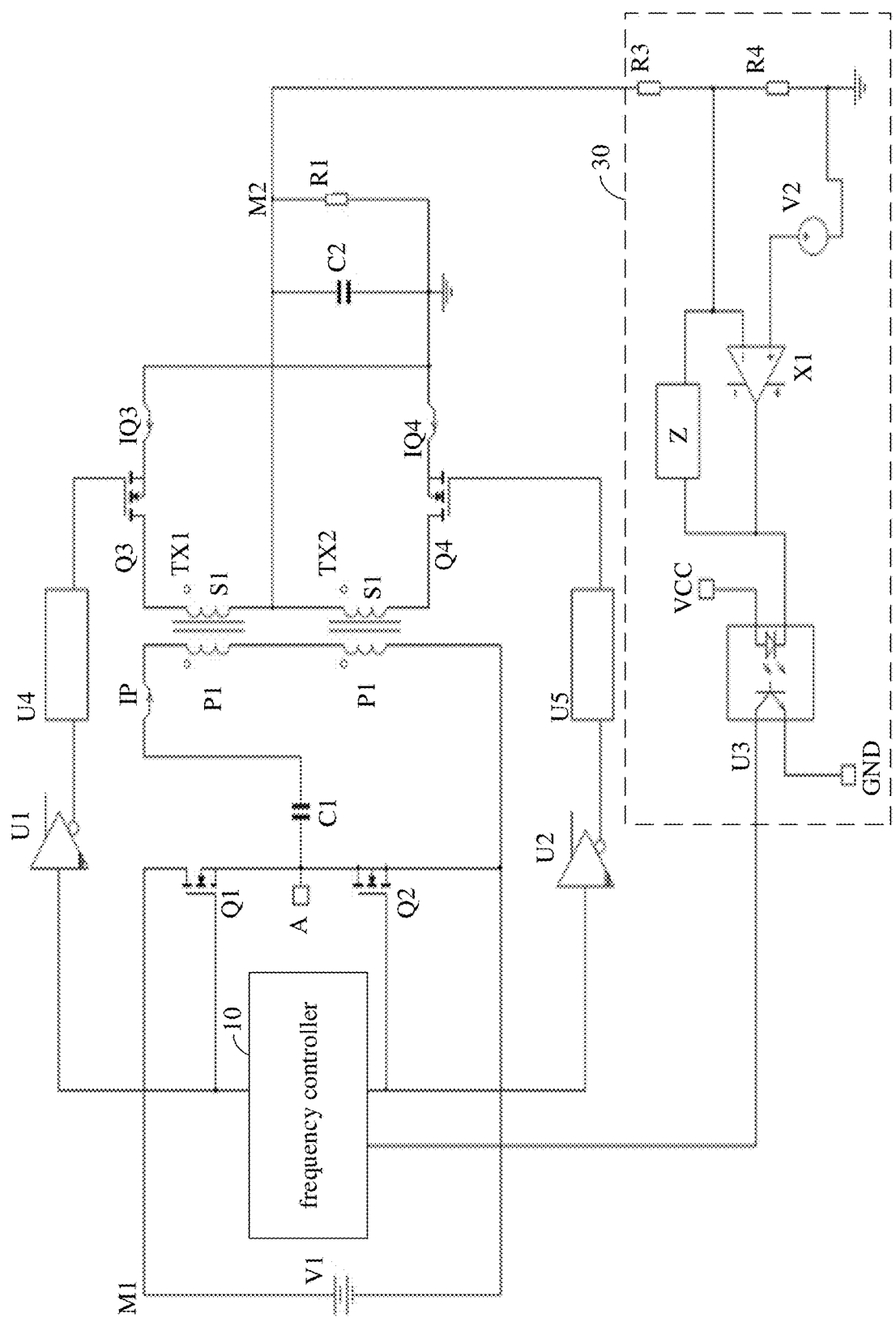
FIG. 2 is a schematic diagram of the circuit structure of the resonant converter according to the second embodiment of the present invention.

As shown in FIG. 2, this embodiment provides a resonant converter including an input terminal M1, an output terminal M2, a first switch Q1, a second switch Q2, a frequency controller 10, a resonant capacitor C1, a first transformer TX1, a second transformer TX2, a feedback circuit 30, a third switch Q3, and a fourth switch Q4. The input terminal M1 is connected to an external power supply V1 and the output terminal M2 is connected to an external load R1. The first switch Q1 and the second switch Q2 are connected in series between the input terminal M1 and ground. The control terminal of the first switch Q1 and the control terminal of the second switch Q2 are both connected to the frequency controller 10. The common terminal connected to the first switch Q1 and the second switch Q2 is connected to one terminal of resonant capacitor C1. The primary side of the first transformer TX1 is connected in series with the primary side of the second transformer TX2. The first terminal of the primary side of the first transformer TX1 is connected to the other terminal of the resonant capacitor C1. The second terminal of the primary side of the second transformer TX2 is connected to the ground. The secondary side of the first transformer TX1 is connected in series with the secondary side of the second transformer TX2. The first terminal of the secondary side of the first transformer TX1 is connected to the ground through the third switch Q3. The second terminal of the secondary side of the second transformer TX2 is connected to the ground through the fourth switch Q4. The common terminal connected to the secondary side of the first transformer TX1 and the secondary side of the second transformer TX2 is connected to the output terminal M2. The feedback circuit 30 is connected between the output terminal M2 and the frequency controller 10. The frequency controller 10 is configured to output a first control signal to control the operation of the first switch Q1 and a second control signal to control the operation of the second switch Q2, based on a feedback signal output from the feedback circuit 30.

The first transformer TX1 and the second transformer TX2 are identical transformers. The first transformer TX1 and the second transformer TX2 have the same excitation inductance, and the same turn ratio of the coils on the primary and secondary sides, forming a symmetrical double-transformer structure. The resonant capacitor C1 can form an LLC resonant circuit with the primary side of the first transformer TX1 and the primary side of the second transformer TX2, respectively, during the operation cycle of the resonant converter. In this embodiment, the first switch Q1, the second switch Q2, the third switch Q3 and the fourth switch Q4 are MOS transistors. In other embodiments, they can also be electronic switching devices. The frequency controller 10 outputs the first control signal and the second control signal with variable frequency, and the first control signal and the second control signal are used to control the conduction and disconnection of the first switch Q1 and the second switch Q2, respectively.

In this embodiment, the frequency controller 10 is located on the same side as the primary side of the first transformer TX1 and the second transformer TX2, and is also configured to output a first control signal to control the first switch Q1 and a second control signal to control the second switch Q2, based on a signal output from the feedback circuit 30. The frequency controller 10 is directly connected to the control terminal of the first switch Q1 and the control terminal of the second switch Q2.

Further, the resonant converter also includes a first NOT gate U1, a second NOT gate U2, a first isolation driver module U4 and a second isolation driver module U5. The first control signal of the first switch Q1 passes through the first NOT gate U1 and the first isolation driver module U4 to obtain the third control signal of the third switch Q3. The second control signal of the second switch Q2 passes through the second NOT gate U2 and the second isolation driver module U5 to obtain the fourth control signal of the fourth switch Q4.

The input of the first NOT gate U1 is connected to the frequency controller 10 and the control terminal of the first switch Q1, and the input of the second NOT gate U2 is connected to the frequency controller 10 and the control terminal of the second switch Q2. The first control signal is reversed by the NOT gate to generate a third control signal with opposite phase, and the second control signal is reversed by the NOT gate to generate a fourth control signal with opposite phase, and the third control signal and the fourth control signal are driven in isolation by the isolation driver module.

The feedback circuit 30 includes: a sampling module, a comparison amplifier module, and an optocoupler U3. The sampling module is used to obtain the voltage value of the output terminal M2. The comparison amplifier module is connected to the sampling module for comparing and amplifying the obtained voltage value of the output terminal M2 to obtain the feedback signal of the frequency controller 10. The transmitting terminal of the optocoupler U3 is connected to the comparison amplifier module, and the receiving terminal thereof is connected to the frequency controller 10 for isolating and feeding back the feedback signal of the frequency controller 10 to the frequency controller 10.

Further, the sampling module includes a first voltage divider resistor R3 and a second voltage divider resistor R4. The first voltage divider resistor R3 and the second voltage divider resistor R4 are connected in series between the output terminal M2 of the resonant converter and the ground, and the common terminal connected to the first voltage divider resistor R3 and the second voltage divider resistor R4 is connected to the comparison amplifier module.

The comparison amplifier module includes an amplifier X1, a voltage source V2 and a compensation circuit Z. The inv-input terminal of the amplifier X1 is connected to the sampling module, and the non-inv-input terminal of the amplifier X1 is connected to the voltage source V2. The output terminal of the amplifier X1 is connected to the transmitting terminal of the optocoupler U3. The compensation circuit Z is connected between the inverting input terminal of the amplifier X1 and the output terminal of the amplifier X1. The voltage source V2 is used to output a preset voltage value, and the compensation circuit Z is an impedance circuit composed of a few resistors and/or capacitors.

Preferably, when the first switch Q1 is on, the third switch Q3 is off; when the second switch Q2 is on, the fourth switch Q4 is off.

Preferably, when the first switch Q1 is off and the second switch Q2 is off, the third switch Q3 is on or the fourth switch Q4 is on.

The operating principle of the resonant converter is described in detail below.

Figure 4:
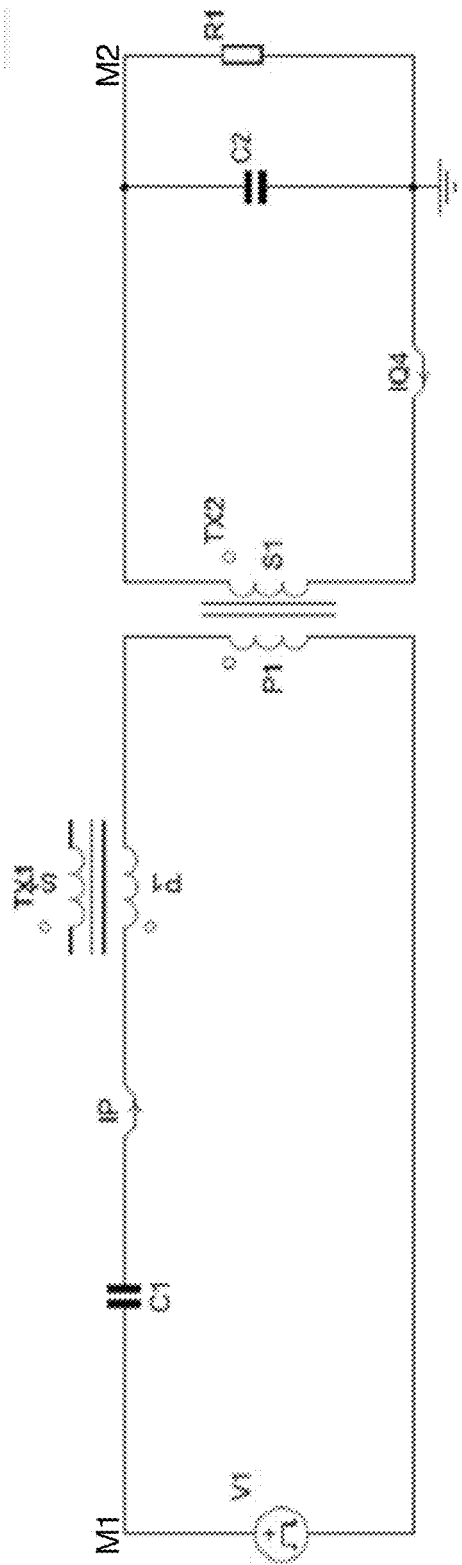
FIG. 4 is a schematic diagram of an equivalent circuit structure of the resonant converter according to an embodiment of the present invention.

(1) When the first switch Q1 is on and the second switch Q2 is off, the third switch Q3 is off and the fourth switch Q4 is on, and the equivalent circuit of the resonant converter is shown in FIG. 4. At this time, the first transformer TX1 works in flyback mode, the second transformer TX2 works in forward mode. The secondary side of the first transformer TX1 is open. The primary side of the first transformer TX1 acts as a resonant inductor to form an LC resonant circuit with the resonant capacitor C1, and the energy output from the secondary side of the second transformer TX2 is output to the load R1 through the fourth switch Q4.

Figure 5:
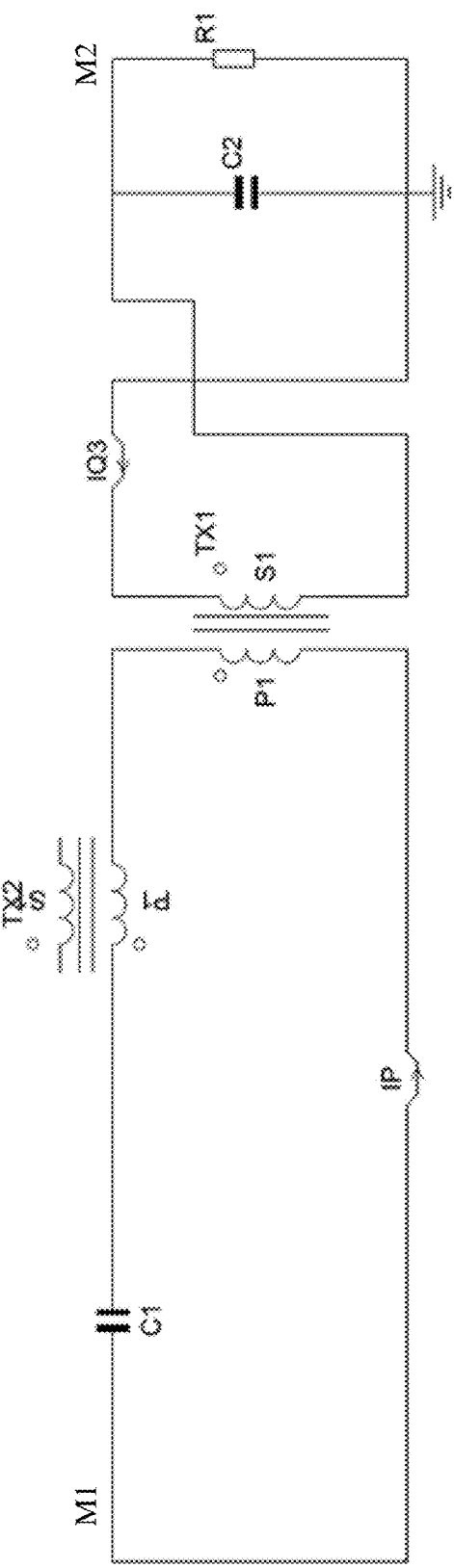
FIG. 5 is a schematic diagram of an equivalent circuit structure of the resonant converter according to an embodiment of the present invention.

(2) When the first switch Q1 is off and the second switch Q2 is on, the third switch Q3 is on and the fourth switch Q4 is off, the equivalent circuit of the resonant converter is shown in FIG. 5. At this time, the second transformer TX2 works in the flyback mode, the first transformer TX1 works in the forward mode. The secondary side of the second transformer TX2 is open. The primary side of the second transformer TX2 acts as a resonant inductor to form an LC resonant circuit with the resonant capacitor C1, and the energy output from the secondary side of the first transformer TX1 is output to the load R1 through the third switch Q3.

When the load R1 changes, it will cause changes in the current at the output terminal M2 of the resonant converter. The feedback circuit 30 feeds back the changes in the current at the output terminal M2 of the resonant converter to the frequency controller 10. That is, when the current of the load R1 increases, the frequency of the control signal output by the frequency controller 10 decreases, and when the current of the load R1 decreases, the frequency of the control signal output by the frequency controller 10 increases, that is, the frequency changes inversely proportional to the current of load R1, thus regulating the voltage at the output terminal M2 of resonant converter to stabilize the voltage at the output terminal M2 of resonant converter.

Figure 6:
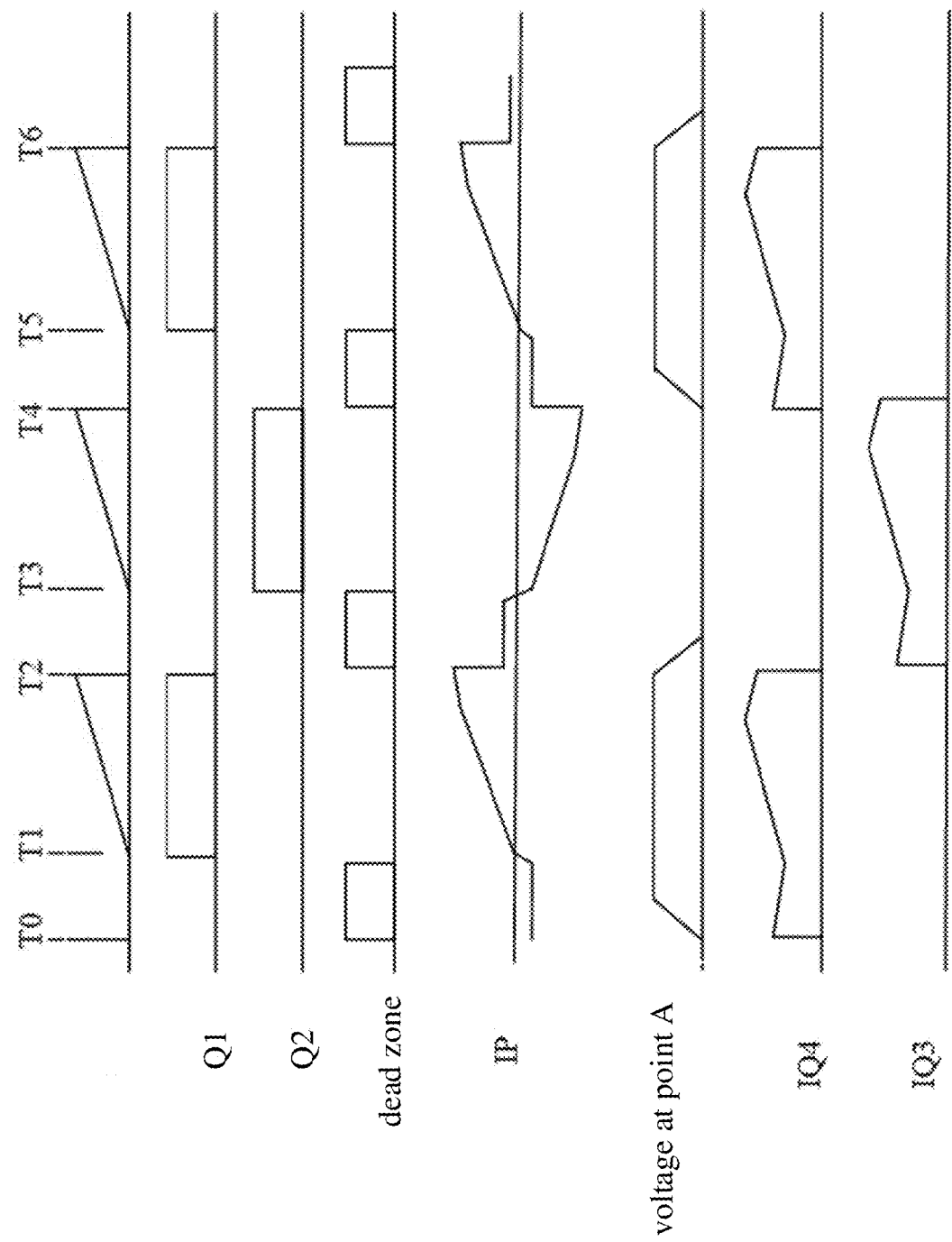
FIG. 6 is a working sequence diagram of the resonant converter according to an embodiment of the present invention.

Referring to FIG. 6, from T0 to T4 is a control cycle. "Q1" is the voltage waveform of the first control signal of the first switch Q1. "Q2" is the voltage waveform of the second control signal of the second switch Q2. "IP" is the current waveform at IP in FIG. 2. "IQ3" is the current waveform at the third switch Q3, and "IQ4" is the current waveform at the fourth switch Q4.

(1) From T0 to T1 is the dead time state. At this time, both the first switch Q1 and the second switch Q2 are in the OFF-state, the third switch Q3 and the fourth switch Q4 are in the ON-state. Before the moment T0, the second transformer TX2 works in the inductive mode. During the time interval between T0 and T1, the stored energy in the second transformer TX2 is output to the load R1 through the fourth switch Q4. The voltage at point A rises from zero at T0 and rises to V1 before the moment T1. The first switch Q1 is in the zero voltage state. The first switch Q1 is on at the moment T1. The primary current of the first transformer TX1 and the primary current of the second transformer TX2 (that is, the current at IP) turn from negative to positive and cross the zero point before the moment T1.

TX2, when acting as an inductor, first stores energy and then transfers energy when being at dead time, before transforming into a transformer and then into an inductor. TX2 is a flyback converter when it when it acts as an inductor, and a forward convertor when it acts as a transformer.

(2) From T1 to T2 is turn-on time zone of Q1. TX2 works in the forward transformer mode. At this time, the first switch Q1 is on, the second switch Q2 is off, the third switch Q3 is off and the fourth switch Q4 is on, the energy is output to the load R1 through the fourth switch Q4. The primary current of the first transformer TX1 and the primary current of the second transformer TX2 rise from zero to a maximum value. Q1 is off at time T2. The primary current of the first transformer TX1 and the primary current of the second transformer TX2 start to decrease from the peak value, and drop to zero during the dead time Td from T2 to T3, crossing the zero point at time T3.

(3) From T2 to T4 is the lower half cycle, and from T2 to T3 is the dead state. The first switch Q1 and the second switch Q2 are in the OFF-state, the third switch Q3 and the fourth switch Q4 are in the ON-state. Before the moment T2, the first transformer TX1 works in the inductive mode. During the time interval between T2 and T3, the stored energy in the first transformer TX1 is output to the load R1 through Q3. The voltage at point A starts to decrease from V1 and drops to zero before the moment T3. The second switch Q2 is in the zero voltage state and the second switch Q2 is on at the moment T3. The primary current of the first transformer TX1 and the primary current of the second transformer TX2 turn from positive to negative and cross the zero point before the moment T3.

(4) From T3 to T4 is the conduction time of the second switch Q2. The first transformer TX1 works in the forward transformer mode. At this time, the first switch Q1 is off, the second switch Q2 is on, the third switch Q3 is on, the fourth switch Q4 is off, and the energy is output to the load R1 through the third switch Q3. The primary current of the first transformer TX1 and the primary current of the second transformer TX2 drop from zero to a minimum value. The second switch Q2 is disconnected at T4. The primary current of the first transformer TX1 and the primary current of the second transformer TX2 return to zero from the peak value, and return to zero during the dead time Td from T4 to T5, crossing the zero point at T5.

In the resonant converter provided by this embodiment, the resonant inductance is an inductance coupled to the secondary side. During each dead time, the energy in the resonant tank is output to the secondary side to create a continuous output current. Whether in the first half cycle or the second half cycle, the first transformer or the second transformer alternately outputs current to the secondary side, expanding the range of input voltage, and improving the dynamic response and power density of the resonant converter. Moreover, the resonant converter provided by this embodiment uses the primary side of the transformer instead of the resonant inductor. The energy stored in the primary side of the transformer can be transferred from the primary side of the transformer to the secondary side of the transformer during the dead time state, thus effectively reducing the switching loss of the primary side and allowing the resonant converter to work at a frequency bands higher than the resonant frequency.

The Third Embodiment

Figure 3:
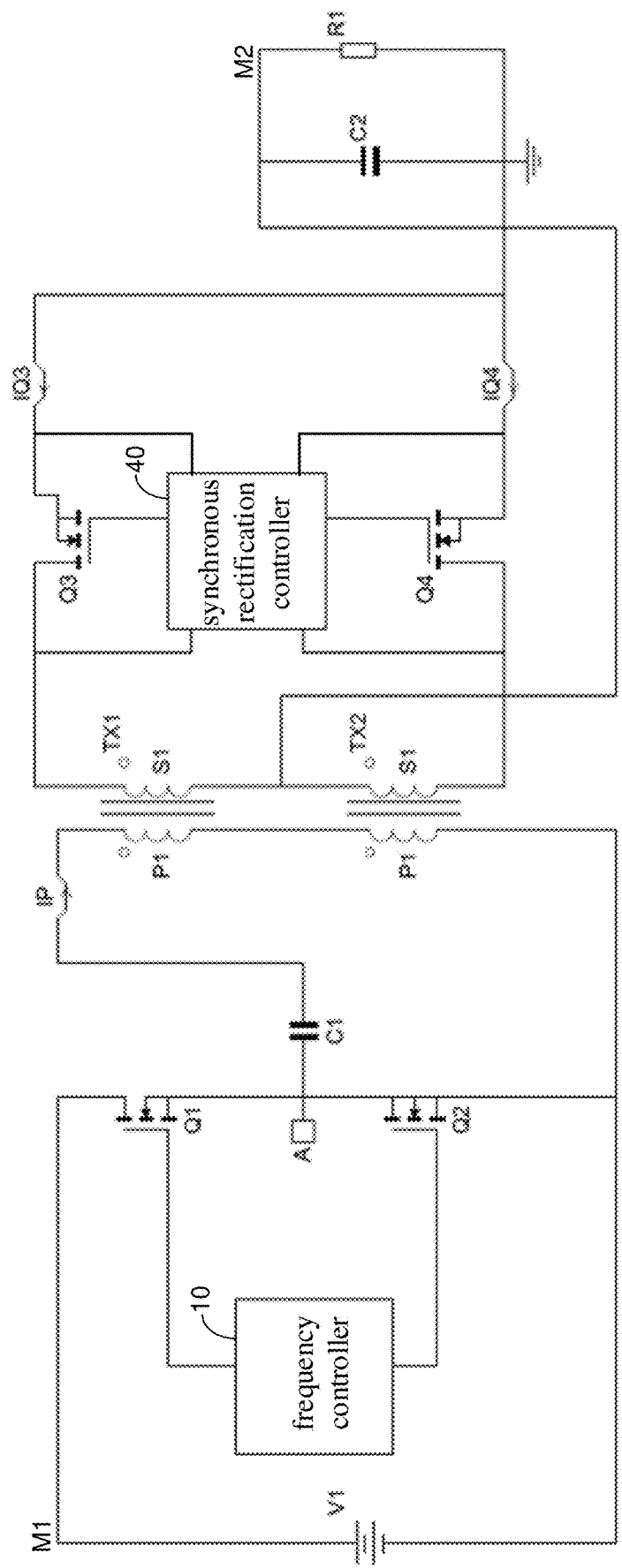
FIG. 3 is a schematic diagram of the circuit structure of the resonant converter according to the third embodiment of the present invention.

As shown in FIG. 3, this embodiment provides a resonant converter including an input terminal M1, an output terminal M2, a first switch Q1, a second switch Q2, a frequency controller 10, a resonant capacitor C1, a first transformer TX1, a second transformer TX2, a feedback circuit, a third switch Q3, and a fourth switch Q4. The input terminal M1 is connected to an external power supply V1 and the output terminal M2 is connected to an external load R1. The first switch Q1 and the second switch Q2 are connected in series between the input terminal M1 and ground. The control terminal of the first switch Q1 and the control terminal of the second switch Q2 are both connected to the frequency controller 10. The common terminal connected to the first switch Q1 and the second switch Q2 is connected to one terminal of resonant capacitor C1. The primary side of the first transformer TX1 is connected in series with the primary side of the second transformer TX2. The first terminal of the primary side of the first transformer TX1 is connected to the other terminal of the resonant capacitor C1. The second terminal of the primary side of the second transformer TX2 is connected to the ground. The secondary side of the first transformer TX1 is connected in series with the secondary side of the second transformer TX2. The first terminal of the secondary side of the first transformer TX1 is connected to the ground through the third switch Q3. The second terminal of the secondary side of the second transformer TX2 is connected to the ground through the fourth switch Q4. The common terminal connected to the secondary side of the first transformer TX1 and the secondary side of the second transformer TX2 is connected to the output terminal M2. The feedback circuit is connected between the output terminal M2 and the frequency controller 10. The frequency controller 10 is configured to output a first control signal to control the first switch Q1 and a second control signal to control the second switch Q2, based on a feedback signal output from the feedback circuit.

The first transformer TX1 and the second transformer TX2 are identical transformers. The first transformer TX1 and the second transformer TX2 have the same excitation inductance, and the same turn ratio of the coils on the primary and secondary sides, forming a symmetrical double-transformer structure. The resonant capacitor C1 can form an LLC resonant circuit with the primary side of the first transformer TX1 and the primary side of the second transformer TX2, respectively, during the operation cycle of the resonant converter. In this embodiment, the first switch Q1, the second switch Q2, the third switch Q3 and the fourth switch Q4 are MOS transistors. In other embodiments, they can also be electronic switching devices. The frequency controller 10 outputs the first control signal and the second control signal with variable frequency, and the first control signal and the second control signal are used to control the conduction and disconnection of the first switch Q1 and the second switch Q2, respectively.

In this embodiment, the frequency controller 10 is located on the same side as the primary side of the first transformer TX1 and the second transformer TX2, and is also configured to output a first control signal to control the first switch Q1 and a second control signal to control the second switch Q2, based on a signal output from the feedback circuit. The frequency controller 10 is directly connected to the control terminal of the first switch Q1 and the control terminal of the second switch Q2.

In this embodiment, the difference between the structure of this embodiment and that of the second embodiment is that: on the secondary side of the transformer, the sources of the control signals of the third switch and the fourth switch are different. In this embodiment, the synchronous rectification controller 40 is used to output the third control signal of the third switch and the fourth control signal of the fourth switch, instead of using the two NOT gates and the two isolation drive modules in FIG. 2.

The first input terminal of the synchronous rectification controller 40 is connected to the first terminal of the secondary side of the first transformer TX1, and the second input terminal of the synchronous rectification controller 40 is connected to the second terminal of the secondary side of the second transformer TX2. The synchronous rectification controller 40 is used to output the fourth control signal of the fourth switch Q4 according to the voltage of the first terminal of the secondary side of the first transformer TX1, and output the third control signal of the three switch Q3 according to the voltage of the second terminal of the secondary side of the second transformer TX2. The synchronous rectification controller 40 provided in the embodiment of the present invention may be a commonly used controller. Preferably, the third control signal and the first control signal are signals with the same frequency and opposite phase, and the fourth control signal and the second control signal are signals with the same frequency and opposite phase.

In this embodiment, the feedback circuit 30 has the same structure as the feedback circuit in the second embodiment, and is omitted and not shown in FIG. 3.

In particular, the feedback circuit 30 includes: a sampling module, a comparison amplifier module, and an optocoupler U3. The sampling module is used to obtain the voltage value of the output terminal M2. The comparison amplifier module is connected to the sampling module for comparing and amplifying the obtained voltage value of the output terminal M2 to obtain the feedback signal of the frequency controller 10. The transmitting terminal of the optocoupler U3 is connected to the comparison amplifier module, and the receiving terminal thereof is connected to the frequency controller 10, for isolating and feeding back the feedback signal of the frequency controller 10 to the frequency controller 10.

Further, the sampling module includes a first voltage divider resistor R3 and a second voltage divider resistor R4. The first voltage divider resistor R3 and the second voltage divider resistor R4 are connected in series between the output terminal M2 of the resonant converter and the ground, and the common terminal connected to the first voltage divider resistor R3 and the second voltage divider resistor R4 is connected to the comparison amplifier module.

The comparison amplifier module includes an amplifier X1, a voltage source V2 and a compensation circuit Z. The inverting input terminal of the amplifier X1 is connected to the sampling module, and the non-inverting input terminal of the amplifier X1 is connected to the voltage source V2. The output terminal of the amplifier X1 is connected to the transmitting terminal of the optocoupler U3. The compensation circuit Z is connected between the inverting input terminal of the amplifier X1 and the output terminal of the amplifier X1. The voltage source V2 is used to output a preset voltage value, and the compensation circuit Z is an impedance circuit composed of a resistor and/or a capacitor.

In addition, in this embodiment, the third switch Q3 and the fourth switch Q4 may also be wide bandgap semiconductor power field effect transistors, for example, they may be gallium nitride field effect transistors.

Preferably, when the first switch Q1 is on, the third switch Q3 is off; when the second switch Q2 is on, the fourth switch Q4 is off. That is, when the first control signal controls the first switch Q1 to conduct, the third control signal controls the third switch Q3 to disconnect; when the second control signal controls the second switch Q2 to conduct, the fourth control signal controls the fourth switch Q4 to disconnect.

Preferably, when the first switch Q1 is off and the second switch Q2 is off, the third switch Q3 is on or the fourth switch Q4 is on. That is, when the first control signal controls the first switch Q1 to disconnect and the second control signal controls the second switch Q2 to disconnect, the third control signal controls the third switch Q3 to conduct and the fourth control signal controls the fourth switch Q4 to conduct.

The working principle of the resonant converter in this embodiment is basically the same as that in the second embodiment, described as following:

(1) When the first switch Q1 is on and the second switch Q2 is off, the third switch Q3 is off and the fourth switch Q4 is on, and the equivalent circuit of the resonant converter is shown in FIG. 4. At this time, the first transformer TX1 works in flyback mode, the second transformer TX2 works in forward mode. The secondary side of the first transformer TX1 is open. The primary side of the first transformer TX1 acts as a resonant inductor to form an LC resonant circuit with the resonant capacitor C1, and the energy output from the secondary side of the second transformer TX2 is output to the load R1 through the fourth switch Q4.

(2) When the first switch Q1 is off and the second switch Q2 is on, the third switch Q3 is on and the fourth switch Q4 is off, the equivalent circuit of the resonant converter is shown in FIG. 5. At this time, the second transformer TX2 works in the flyback mode, the first transformer TX1 works in the forward mode. The secondary side of the second transformer TX2 is open. The primary side of the second transformer TX2 acts as a resonant inductor to form an LC resonant circuit with the resonant capacitor C1, and the energy output from the secondary side of the first transformer TX1 is output to the load R1 through the third switch Q3.

As an example, refer to FIG. 6, from T0 to T4 is a control cycle. "Q1" is the voltage waveform of the first control signal of the first switch Q1. "Q2" is the voltage waveform of the second control signal of the second switch Q2. "IP" is the current waveform at IP in FIG. 1. "IQ3" is the current waveform at the third switch Q3, and "IQ4" is the current waveform at the fourth switch Q4.

(1) From T0 to T1 is the dead time state. At this time, both the first switch Q1 and the second switch Q2 are in the OFF-state, the third switch Q3 and the fourth switch Q4 are in the ON-state. Before the moment T0, the second transformer TX2 works in the inductive mode. During the time interval between T0 and T1, the stored energy in the second transformer TX2 is output to the load R1 through the fourth switch Q4. The voltage at point A rises from zero at T0 and rises to V1 before the moment T1. The first switch Q1 is in the zero voltage state, the first switch Q1 is on at the moment T1. The primary current of the first transformer TX1 and the primary current of the second transformer TX2 (that is, the current at IP) turn from negative to positive and cross the zero point before the moment T1.

TX2, when acting as an inductor, first stores energy and then transfers energy when being at dead time, before transforming into a transformer and then into an inductor. TX2 is a flyback converter when it acts as an inductor, and a forward converter when it acts as a transformer.

In addition, in other embodiments, at this time, both the first switch Q1 and the second switch Q2 are in the OFF-state, or it can be that the third switch Q3 is in the OFF-state, and the fourth switch Q4 is in the ON-state.

(2) From T1 to T2 is turn-on time zone of Q1. TX2 works in the forward transformer mode. At this time, the first switch Q1 is on, the second switch Q2 is off, the third switch Q3 is off and the fourth switch Q4 is on, the energy is output to the load R1 through the fourth switch Q4. The primary current of the first transformer TX1 and the primary current of the second transformer TX2 rise from zero to a maximum value. Q1 is disconnected at T2. The primary current of the first transformer TX1 and the primary current of the second transformer TX2 start to decrease from the peak value, and drop to zero during the dead time Td from T2 to T3, crossing the zero point at time T3.

(3) From T2 to T4 is the lower half cycle, and from T2 to T3 is the dead state. The first switch Q1 and the second switch Q2 are in the OFF-state, the third switch Q3 and the fourth switch Q4 are in the ON-state. Before the moment T2, the first transformer TX1 works in the inductive mode. During the time interval between T2 and T3, the stored energy in the first transformer TX1 is output to the load R1 through Q3. The voltage at point A starts to decrease from V1 and drops to zero before the moment T3. The second switch Q2 is in the zero voltage state and the second switch Q2 is on at the moment T3. The primary current of the first transformer TX1 and the primary current of the second transformer TX2 turn from positive to negative and cross the zero point before the moment T3.

In addition, in other embodiments, at this time, both the first switch Q1 and the second switch Q2 are in the OFF-state, or it can be that the third switch Q3 is in the ON-state, and the fourth switch Q4 is in the OFF-state.

(4) From the moment T3 to T4, is the conduction time of the second switch Q2. The first transformer TX1 works in the forward transformer mode. At this time, the first switch Q1 is off, the second switch Q2 is on, the third switch Q3 is on, the fourth switch Q4 is off, and the energy is output to the load R1 through the third switch Q3. The primary current of the first transformer TX1 and the primary current of the second transformer TX2 drop from zero to a minimum value. The second switch Q2 is disconnected at T4. The primary current of the first transformer TX1 and the primary current of the second transformer TX2 return to zero from the peak value, and return to zero during the dead time Td from T4 to T5, crossing the zero point at T5.

Compared with the second embodiment, the resonant converter in this embodiment omits the NOT gates and the isolation drivers, and uses the secondary side of the transformer working in the inductance mode as the isolation driver or the drive signal source, i.e., the secondary side of the first transformer TX1 drives the fourth switch Q4 the secondary side of the second transformer TX2 drives the third switch Q3.

In this this embodiment, the resonant converter includes a first transformer and a second transformer, and the primary side of the first transformer is connected in series with the primary side of the second transformer. The primary side of one transformer is equivalent to a resonant inductor in a conventional circuit, at the same time, a synchronous rectification controller is used to control the third switch and the fourth switch on the secondary side. In the dead time of the first switch and the second switch, the synchronous rectification controller outputs a fourth control signal to control the fourth switch based on the voltage of the first terminal of the secondary side of the first transformer, and outputs a third control signal to control the third switch based on the voltage of the second terminal of the secondary side of the second transformer, that is, when the first switch is off and the second switch is off, the third switch or the fourth switch are controlled to be on by the frequency controller, or, the third switch and the fourth switch are both controlled to be on, so that the energy in the resonant tank can be output to the secondary side to form a continuous output current. Whether in the first half cycle or the second half cycle, the first transformer TX1 or the second transformer TX2 alternately outputs current to the secondary side, expanding the input voltage range and improving the dynamic response and power density of the resonant converter. Moreover, resonant converter in the present invention uses the primary side of the transformer instead of the resonant inductor, so that the energy stored in the primary side of the transformer can be transferred from the primary side of the transformer to the secondary side of the transformer during the dead time state, thus effectively reducing the switching loss of the primary side and allowing the resonant converter to work at a variable high frequency.

In addition, compared with the case of using diodes for rectification, because diodes have the characteristics such as large power consumption and large switching time delay, and because diodes are passive switching elements that cannot be actively controlled by a frequency controller, this embodiment uses the frequency controller to control the on/off of the third switch and the fourth switch to realize the rectification, which not only avoids the problem of large losses caused by using the diode for rectification, but also further reduces the power consumption of the resonant converter, improves the efficiency of the resonant converter, and achieves the purpose of saving power. Moreover, due to the smaller switching delay, higher frequencies can be achieved, which can be applied in higher frequency scenarios. And compared with the method of using diodes for rectification, this embodiment uses the third switch and the fourth switch to achieve rectification, which can better meet the needs of high current and low voltage output.

The Fourth Embodiment

Figure 7:
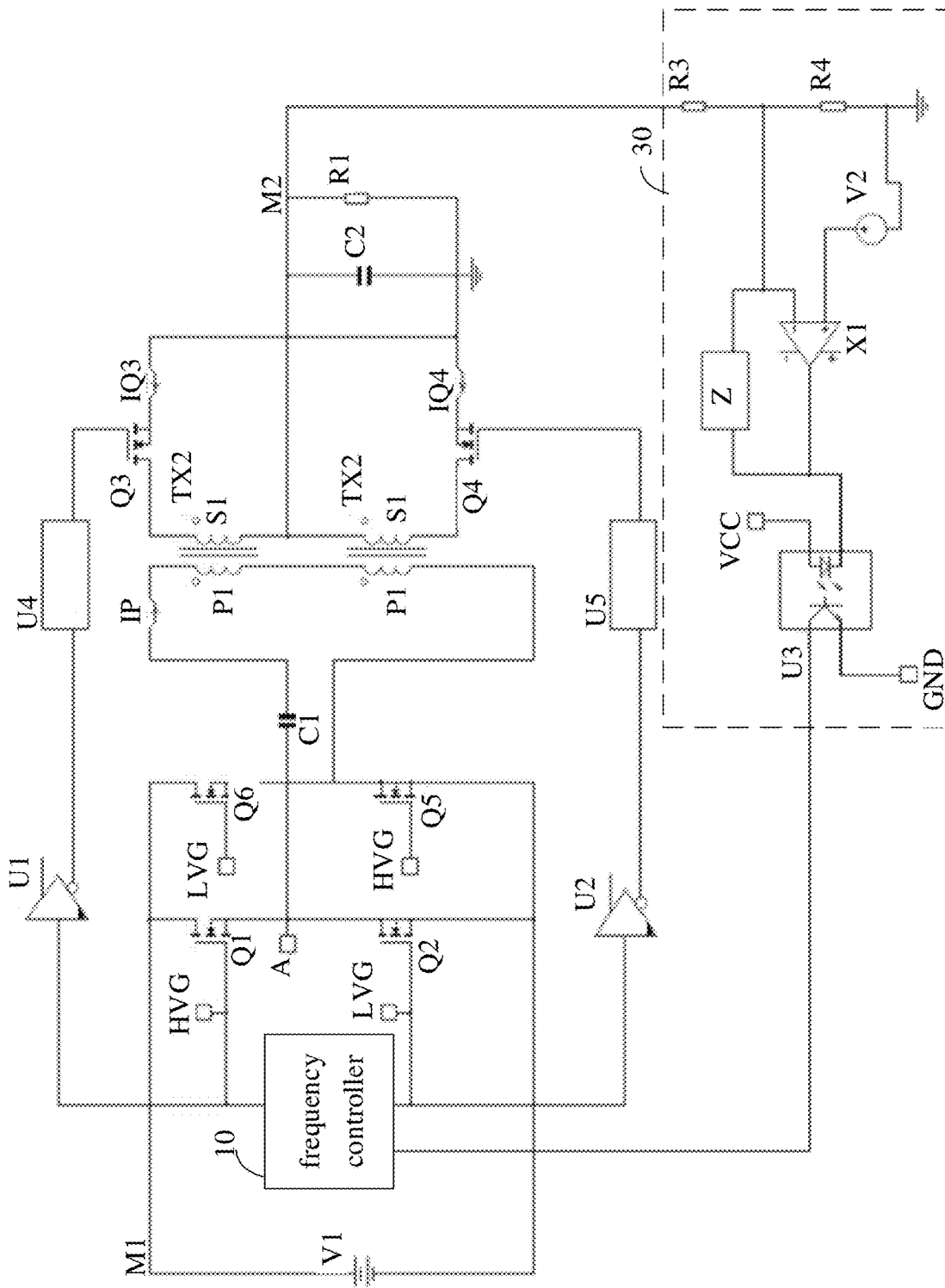
FIG. 7 is a schematic diagram of the circuit structure of the resonant converter according to the fourth embodiment of the present invention.

FIG. 7 shows a circuit structure of a resonant converter of the fourth embodiment provided on the basis of the structure of the second embodiment. The difference from the second embodiment is that: the resonant converter further includes a fifth switch Q5 and a sixth switch Q6; the fifth switch Q5 and the sixth switch Q6 are connected in series between the input terminal M1 and the ground; the second terminal of the primary side of the second transformer TX2 is connected to the ground through the fifth switch Q5, and the sixth switch Q6 is connected to the input terminal M1.

In this case, the first switch Q1, the second switch Q2, the fifth switch Q5, and the sixth switch Q6 form a full-bridge circuit to form a full-bridge resonant converter, so that the external power supply V1 can be more fully utilized.

In this case, the first switch Q1 and the fifth switch Q5 are simultaneously on or simultaneously off, and the second switch Q2 and the sixth switch Q6 are simultaneously on or simultaneously off, the control terminal of the fifth switch Q5 is connected to the frequency controller 10, the control terminal of the sixth switch Q6 is connected to the frequency controller 10, and the first control signal is input to the control terminal of the fifth switch Q5, the second control signal is input to the control terminal of the sixth switch Q6. The working principle is the same as that of the resonant converter in the second embodiment, and will not be described herein.

In addition, the switch structure of the full-bridge can also be used in the first or the third embodiments. No further examples will be given herein. It should be understood that the description of this embodiment should not limit the protection scope of the present invention.

The Fifth Embodiment

Figure 8:
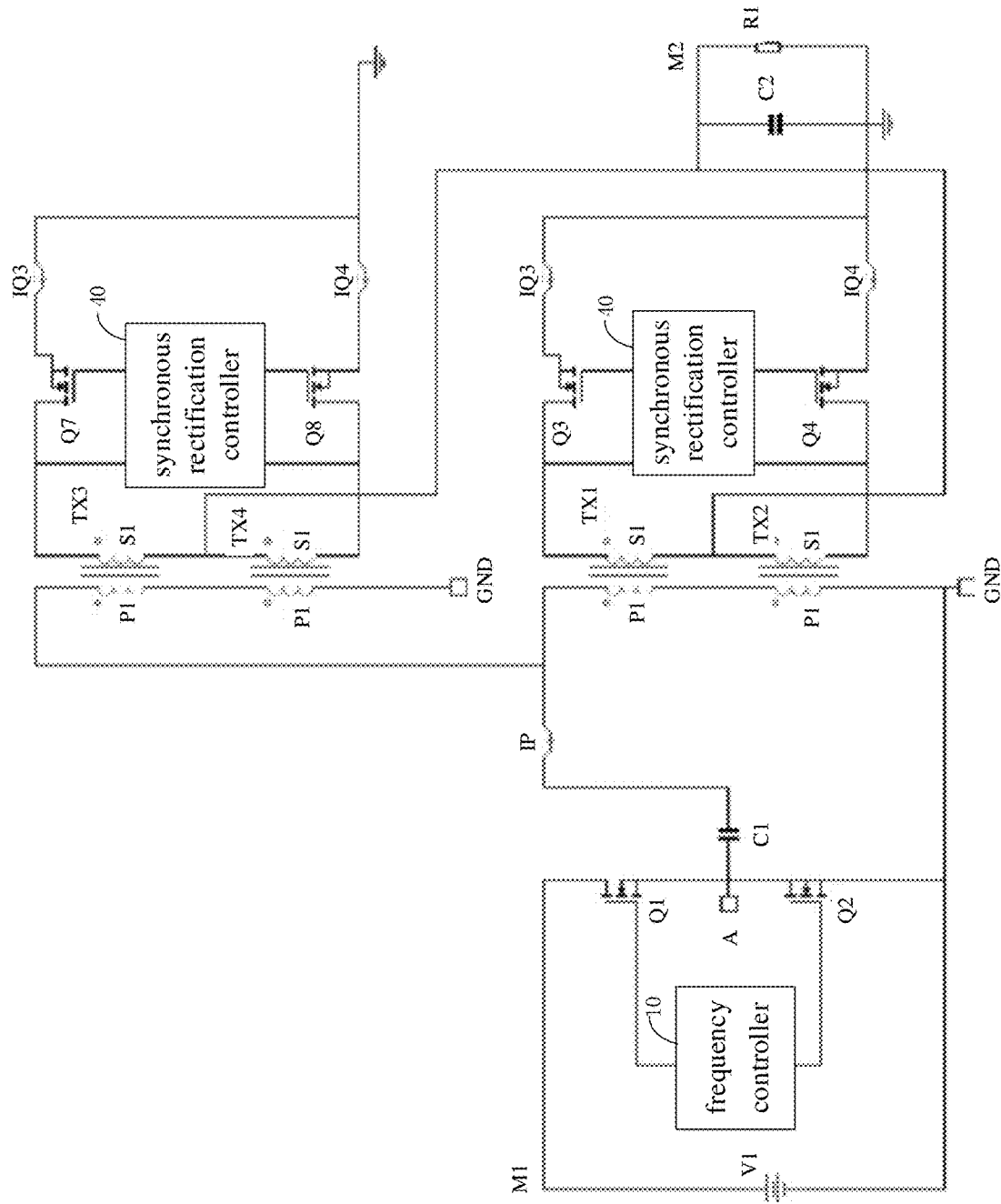
FIG. 8 is a schematic diagram of the circuit structure of the resonant converter according to the fifth embodiment of the present invention.

FIG. 8 shows a circuit structure of a resonant converter of the fifth embodiment provided on the basis of the structure of the third embodiment. The difference from the third embodiment is that: the resonant converter further includes a third transformer TX3, a fourth transformer TX4, a seventh switch Q7, and an eighth switch Q8; the primary side of the third transformer TX3 is connected in series with the primary side of the fourth transformer TX4, and a first terminal of the primary side of the third transformer TX3 is connected to the other terminal of the resonant capacitor C1, a second terminal of the primary side of the fourth transformer TX4 is connected to the ground; the secondary side of the third transformer TX3 and the secondary side of the fourth transformer TX4 are connected in series, and a first terminal of the secondary side of the third transformer TX3 is connected to the ground through the seventh switch Q7; a second terminal of the secondary side of the fourth transformer TX4 is connected to the ground through the eighth switch Q8; a common terminal connected to the secondary side of the third transformer TX3 and the secondary side of the fourth transformer TX4 is connected the output terminal M2.

The resonant converter adopts a parallel topology structure, and the circuit module added is the same as the circuit structure of the corresponding part in the third embodiment. In practical applications, this circuit module can be used as a basic module unit, so that product designs for various power levels of resonant converters can be realized by adding multiple identical circuit modules.

The third transformer TX3 and the fourth transformer TX4 are the same as the first transformer TX1 and the second transformer TX2, with the same excitation inductance as the first transformer TX1 and the second transformer TX2, and the same turn ratio of the coils in the primary and secondary sides of the transformer, forming a symmetrical double-transformer structure. The resonant capacitor C1 can form the same LLC resonant circuit with the primary side of third transformer TX3 and the primary side of the fourth transformer TX4, respectively, during the operation cycle of the resonant converter. In this case, the seventh switch Q7 and the third switch Q3 are simultaneously on or simultaneously off, and the eighth switch Q8 and the fourth switch Q4 are simultaneously on or simultaneously off.

In addition, the parallel topology structure can also be used in the first, the second and the fourth embodiments. No further examples will be given herein. It should be understood that the description of this embodiment should not limit the protection scope of the present invention.

It should be understood that the embodiments above are merely illustrative and not restrictive and that, without departing from the basic principles of the present invention, various obvious or equivalent modifications or substitutions that may be made by a person skilled in the art, shall fall within the protection scope of the claims of the present invention.

What is claimed is:

1. A resonant converter comprising an input terminal, an output terminal, a first switch, a second switch, a third switch, a fourth switch, a frequency controller, a resonant capacitor, a first transformer, a second transformer, a feedback circuit and a synchronous rectification controller; wherein:
    the input terminal is connected to an external power supply and the output terminal is connected to an external load;
    the first switch and the second switch are connected in series between the input terminal and a ground, and a control terminal of the first switch and a control terminal of the second switch are both connected to the frequency controller; a common terminal connected to the first switch and the second switch is connected to one terminal of resonant capacitor;
    a second terminal of the primary side of the first transformer is connected to a first terminal of primary side of the second transformer, and a first terminal of the primary side of the first transformer is connected to the other terminal of the resonant capacitor, a second terminal of the primary side of the second transformer is connected to the ground;
    a second terminal of the secondary side of the first transformer is connected in series with the secondary side of the second transformer, and a first terminal of the secondary side of the first transformer is connected to the ground through the third switch; a second terminal of the secondary side of the second transformer is connected to the ground through the fourth switch; a common terminal connected to the secondary side of the first transformer and the secondary side of the second transformer is connected to the output terminal;
    the feedback circuit is connected between the output terminal and the frequency controller;
    the frequency controller is configured to output a first control signal to control the first switch and a second control signal to control the second switch, based on a feedback signal output by the feedback circuit, so that the first transformer and the second transformer alternately output currents to the secondary side;
    a first input terminal of the synchronous rectification controller is connected to the first terminal of the secondary side of the first transformer, and a second input terminal of the synchronous rectification controller is connected to the second terminal of the secondary side of the second transformer;
    the synchronous rectification controller is configured to output a fourth control signal to control the fourth switch based on a voltage of the first terminal of the secondary side of the first transformer, and output a third control signal to control the third switch based on a voltage of the second terminal of the secondary side of the second transformer.

2. The resonant converter according to claim 1, wherein the first transformer and the second transformer are identical transformers.

3. The resonant converter according to claim 1, wherein the feedback circuit comprises a sampling module, a comparison amplifier module, and an optocoupler; wherein
    the sampling module is configured to obtain a voltage value of the output terminal;
    the comparison amplifier module is connected to the sampling module for comparing and amplifying the obtained voltage value of the output terminal to obtain the feedback signal of the frequency controller;
    a transmitting terminal of the optocoupler is connected to the comparison amplifier module, and a receiving terminal of the optocoupler is connected to the frequency controller, for isolating and feeding back the feedback signal of the frequency controller to the frequency controller.

4. The resonant converter according to claim 1, wherein when the first control signal controls the first switch to disconnect and the second control signal controls the second switch to disconnect, the third control signal controls the third switch to conduct or the fourth control signal controls the fourth switch to conduct.

5. The resonant converter according to claim 1, wherein when the first control signal controls the first switch to conduct, the third control signal controls the third switch to disconnect; when the second control signal controls the second switch to conduct, the fourth control signal controls the fourth switch to disconnect.

6. The resonant converter according to claim 1, wherein the third control signal and the first control signal are signals with the same frequency and opposite phase, and the fourth control signal and the second control signal are signals with the same frequency and opposite phase.

7. The resonant converter according to claim 1, wherein the third switch and the fourth switch are MOS transistor or wide bandgap semiconductor power field-effect transistor.

8. The resonant converter according to claim 1, wherein the first switch, the second switch, the third switch and the fourth switch are MOS transistor.

9. The resonant converter according to claim 1, further comprising a fifth switch and a sixth switch; wherein the fifth switch and the sixth switch are connected in series between the input terminal and the ground; the second terminal of the primary side of the second transformer is connected to the ground through the fifth switch.

10. The resonant converter according to claim 9, wherein the first switch and the fifth switch are simultaneously on or simultaneously off, and the second switch and the sixth switch are simultaneously on or simultaneously off.

11. The resonant converter according to claim 1, further comprising a third transformer, a fourth transformer, a seventh switch, and an eighth switch; wherein:
   a second terminal of the primary side of the third transformer is connected to a first terminal of the primary side of the fourth transformer, and a first terminal of the primary side of the third transformer is connected to the other terminal of the resonant capacitor, a second terminal of the primary side of the fourth transformer is connected to the ground; the secondary side of the third transformer and the secondary side of the fourth transformer are connected in series, and a first terminal of the secondary side of the third transformer is connected to the ground through the seventh switch; a second terminal of the secondary side of the fourth transformer is connected to the ground through the eighth switch; a common terminal connected to the secondary side of the third transformer and the secondary side of the fourth transformer is connected the output terminal.

12. The resonant converter according to claim 11, wherein the first transformer, the second transformer, the third transformer and the fourth transformer are identical transformers.

13. The resonant converter according to claim 11, wherein the third switch and the seventh switch are simultaneously on or simultaneously off, and the fourth switch and the eighth switch are simultaneously on or simultaneously off.

14. The resonant converter according to claim 2, wherein when the first control signal controls the first switch to disconnect and the second control signal controls the second switch to disconnect, the third control signal controls the third switch to conduct or the fourth control signal controls the fourth switch to conduct.

15. The resonant converter according to claim 3, wherein when the first control signal controls the first switch to disconnect and the second control signal controls the second switch to disconnect, the third control signal controls the third switch to conduct or the fourth control signal controls the fourth switch to conduct.

16. The resonant converter according to claim 2, the third control signal controls the third switch to disconnect; when the second control signal controls the second switch to conduct, the fourth control signal controls the fourth switch to disconnect.

17. The resonant converter according to claim 3, wherein when the first control signal controls the first switch to conduct, the third control signal controls the third switch to disconnect; when the second control signal controls the second switch to conduct, the fourth control signal controls the fourth switch to disconnect.

18. The resonant converter according to claim 3, wherein the third control signal and the first control signal are signals with the same frequency and opposite phase, and the fourth control signal and the second control signal are signals with the same frequency and opposite phase.

19. The resonant converter according to claim 3, further comprising a fifth switch and a sixth switch; wherein the fifth switch and the sixth switch are connected in series between the input terminal and the ground; the second terminal of the primary side of the second transformer is connected to the ground through the fifth switch.

20. The resonant converter according to claim 3, further comprising a third transformer, a fourth transformer, a seventh switch, and an eighth switch; wherein:
   a second terminal of the primary side of the third transformer is connected to a first terminal of the primary side of the fourth transformer, and a first terminal of the primary side of the third transformer is connected to the other terminal of the resonant capacitor, a second terminal of the primary side of the fourth transformer is connected to the ground; the secondary side of the third transformer and the secondary side of the fourth transformer are connected in series, and a first terminal of the secondary side of the third transformer is connected to the ground through the seventh switch; a second terminal of the secondary side of the fourth transformer is connected to the ground through the eighth switch; a common terminal connected to the secondary side of the third transformer and the secondary side of the fourth transformer is connected the output terminal.

\* \* \* \* \*